US009945483B2

(12) United States Patent
Benner et al.

(10) Patent No.: US 9,945,483 B2
(45) Date of Patent: Apr. 17, 2018

(54) SYSTEM AND APPARATUS FOR AERODYNAMICALLY SEALING SURFACES

(71) Applicants: Kent W. Benner, Fort Worth, TX (US); Roland A. Creswell, Fort Worth, TX (US); James K. Lash, Rhome, TX (US); William Alfred Thomas, Jr., Fort Worth, TX (US)

(72) Inventors: Kent W. Benner, Fort Worth, TX (US); Roland A. Creswell, Fort Worth, TX (US); James K. Lash, Rhome, TX (US); William Alfred Thomas, Jr., Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 268 days.

(21) Appl. No.: 14/269,578

(22) Filed: May 5, 2014

(65) Prior Publication Data
US 2016/0138715 A1 May 19, 2016

(51) Int. Cl.
| F16J 15/02 | (2006.01) |
| B64C 7/00 | (2006.01) |
| F16J 15/3224 | (2016.01) |
| F16J 15/06 | (2006.01) |
| F16J 15/08 | (2006.01) |
| F16J 15/10 | (2006.01) |

(52) U.S. Cl.
CPC ............. F16J 15/022 (2013.01); B64C 7/00 (2013.01); F16J 15/025 (2013.01); F16J 15/027 (2013.01); F16J 15/028 (2013.01); F16J 15/062 (2013.01); F16J 15/0887 (2013.01); F16J 15/104 (2013.01); F16J 15/3224 (2013.01)

(58) Field of Classification Search
None
See application file for complete search history.

(56) References Cited

U.S. PATENT DOCUMENTS

| 2,730,777 A | | 1/1956 | Koriagin | |
| 3,992,815 A | * | 11/1976 | Potter | E05B 65/0888 292/263 |
| 4,225,903 A | | 9/1980 | Buchleitner | |
| 4,358,497 A | * | 11/1982 | Miska | E06B 7/2314 156/1 |

(Continued)

FOREIGN PATENT DOCUMENTS

| DE | 0000 197 11 175 A1 | 9/1998 | ............... H05K 9/00 |
| DE | 20 2011 102 257 U1 | 2/2012 | ............... A47K 3/34 |

Primary Examiner — Vishal A Patel
(74) Attorney, Agent, or Firm — Baker Botts L.L.P.

(57) ABSTRACT

A system includes a first surface, a second surface, and a sealing system operable to provide an aerodynamic seal between the first surface and the second surface. The second surface may be a surface to be sealed. The sealing system includes a first member and a base. The first member includes a first portion and a bulb coupled to the first portion. The first portion has one or more projections and is adapted to couple the first member to the first surface. The base includes a plurality of feet, a plurality of arms, and an arched portion. The plurality of feet are adapted to be positioned against the second surface. The plurality of arms are adapted to accept the bulb. The arched portion forms a preloaded seal adapted to seal against the second surface when air pressure is exerted against a side of the base.

19 Claims, 7 Drawing Sheets

(56) References Cited

U.S. PATENT DOCUMENTS

| | | | |
|---|---|---|---|
| 4,399,640 A * | 8/1983 | Porter | E06B 3/28 160/368.1 |
| 4,447,065 A | 5/1984 | Dupuy et al. | |
| 4,452,020 A * | 6/1984 | Werner | E06B 3/28 49/62 |
| 4,454,691 A * | 6/1984 | Mitchell | E06B 9/04 160/107 |
| 4,581,865 A * | 4/1986 | Miller | E06B 3/28 52/202 |
| 4,708,351 A | 11/1987 | Midooka et al. | |
| 4,733,510 A * | 3/1988 | Werner | E06B 3/28 428/34 |
| 4,813,184 A | 3/1989 | Weimar | |
| 5,086,604 A * | 2/1992 | Orth | E06B 3/28 52/202 |
| 5,095,657 A | 3/1992 | Marsh | |
| 5,657,598 A * | 8/1997 | Wilbs | A47G 27/045 403/122 |
| 5,692,758 A * | 12/1997 | Wikstrom | F16J 15/106 277/591 |
| 6,617,015 B2 | 9/2003 | Rood | |
| 7,219,899 B2 | 5/2007 | Kesseg | |
| 7,281,715 B2 * | 10/2007 | Boswell | F24C 15/102 219/452.11 |
| 7,392,627 B2 * | 7/2008 | Sondermann | E04F 19/062 52/395 |
| 7,797,900 B2 * | 9/2010 | Sondermann | E04F 19/062 52/287.1 |
| 7,891,671 B2 | 2/2011 | Allford | |
| 7,942,368 B2 | 5/2011 | Lloyd | |
| 8,128,396 B2 | 3/2012 | Ross | |
| 2002/0095895 A1 * | 7/2002 | Daly | E04F 19/062 52/464 |
| 2004/0018339 A1 | 1/2004 | Rood | |
| 2011/0037228 A1 | 2/2011 | Thomas, Jr. | |
| 2011/0083392 A1 * | 4/2011 | Timko | E04F 13/0816 52/582.1 |
| 2012/0151858 A1 * | 6/2012 | Friedman | E06B 3/28 52/309.1 |

\* cited by examiner

SYSTEM AND APPARATUS FOR AERODYNAMICALLY SEALING SURFACES

TECHNICAL FIELD

This disclosure generally relates to seals, and more particularly to a system and apparatus for aerodynamically sealing surfaces.

BACKGROUND

It may be desirable to seal structures, such as components of an aircraft, from external and internal differential pressures. It may also be desirable to create an aerodynamic seal. Sometimes, effectively sealing structures is challenging. In some cases, the surfaces of the structures may have various contours, making effective sealing difficult. In some other cases, there may be deflections between mating parts of the structures that create further difficulties.

SUMMARY OF EXAMPLE EMBODIMENTS

According to embodiments of the present disclosure, disadvantages and problems associated with previous techniques for aerodynamically sealing surfaces may be reduced or eliminated.

In certain embodiments, a system for aerodynamically sealing surfaces is disclosed. A system includes a first surface, a second surface, and a seal operable to provide an aerodynamic seal between the first surface and the second surface. The second surface may be a surface to be sealed. The seal includes a first member and a base. The first member includes a first portion and a bulb coupled to the first portion. The first portion has one or more projections and is adapted to couple the first member to the first surface. The base includes a plurality of feet, a plurality of arms, and an arched portion. The plurality of feet are adapted to be positioned against the second surface. The plurality of arms are adapted to accept the bulb. The arched portion forms a preloaded seal adapted to seal against the second surface when air pressure is exerted against a side of the base.

Certain embodiments of the present disclosure may provide one or more technical advantages. For example, an advantage of some embodiments may be that the sealing system seals structures from external and internal differential pressures, creating an aerodynamic seal. For example, the sealing system may form an aerodynamic seal between components of an aircraft, such as an external fuel tank and the fuselage of the aircraft. As another advantage, the base of the sealing system may include an arched portion that forms a preloaded seal. In certain embodiments, the arched portion forming the preloaded seal may be adapted to seal against a surface to be sealed in response to pressure on a side of the seal. Such an embodiment may prevent the flow of air under the base of the sealing system, thereby sealing the structures from external and internal differential pressure.

In certain embodiments, the first and second surfaces may have various contours, or have deflections between mating parts. As another advantage, in certain embodiments the sealing system may be adapted to adjust to contours of the surfaces. For example, the base of the sealing system may be adapted to conform to contour changes along a surface, such as the fuselage of an aircraft. Additionally, in certain embodiments, the sealing system may be adapted to self-align with deflections between the surfaces. For example, in certain embodiments the bulb may be adapted to rotate in the base of the sealing system, allowing the sealing system to self-align to deflections. As another advantage, the bulb may have vertical compression or springiness that allows the sealing system to advantageously accommodate up and down deflections.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Embodiments of the present invention and its advantages are best understood by referring to FIGS. 1-7, like numerals being used for like and corresponding parts of the various drawings.

Sealing structures from external and internal differential pressures where large deflections between the mating parts occur can be difficult to accomplish effectively. For example, creating aerodynamic seals between external components of an aircraft may be challenging. Existing seals have proven ineffective, at least in part due to a tendency of the seals to flex as pressure is applied to them, resulting in air leaking under them. Existing seals may suffer from a variety of deficiencies ranging from failing to seal well to an inability to align to various, or varying, surfaces. This may cause undesirable results, such as unwanted vibration or fatigue of the seals.

In general, the disclosed embodiments illustrate a system and method of aerodynamically sealing surfaces from external and internal differential pressures. In certain embodiments, a sealing system may include a first member and a base. In certain embodiments, air pressure exerted against the base may force the seal to seal against a surface to be sealed. In certain embodiments, the first member may accommodate deflections between sealed surfaces by rotating relative to the base.

In certain embodiments, the sealing system may be adapted to seal a variety of surfaces, for example the surfaces of an aircraft, car, boat, or any other vehicle. In certain other embodiments, the sealing system may be adapted to seal components of windows, such as household windows or windows of other structures. In certain other embodiments, the sealing system may be adapted to seal doors, such as household doors, from external and internal differential pressures. In some embodiments, the base may include an arch that forms a preloaded seal adapted to seal against a surface to be sealed in response to air pressure or other force. In some embodiments, the sealing system may have a first member that, in certain embodiments, may have a bulb. In certain embodiments, the bulb may be adapted to compress to absorb deflections and rotate to conform to contour changes by self-aligning with deflections.

Figure 1:
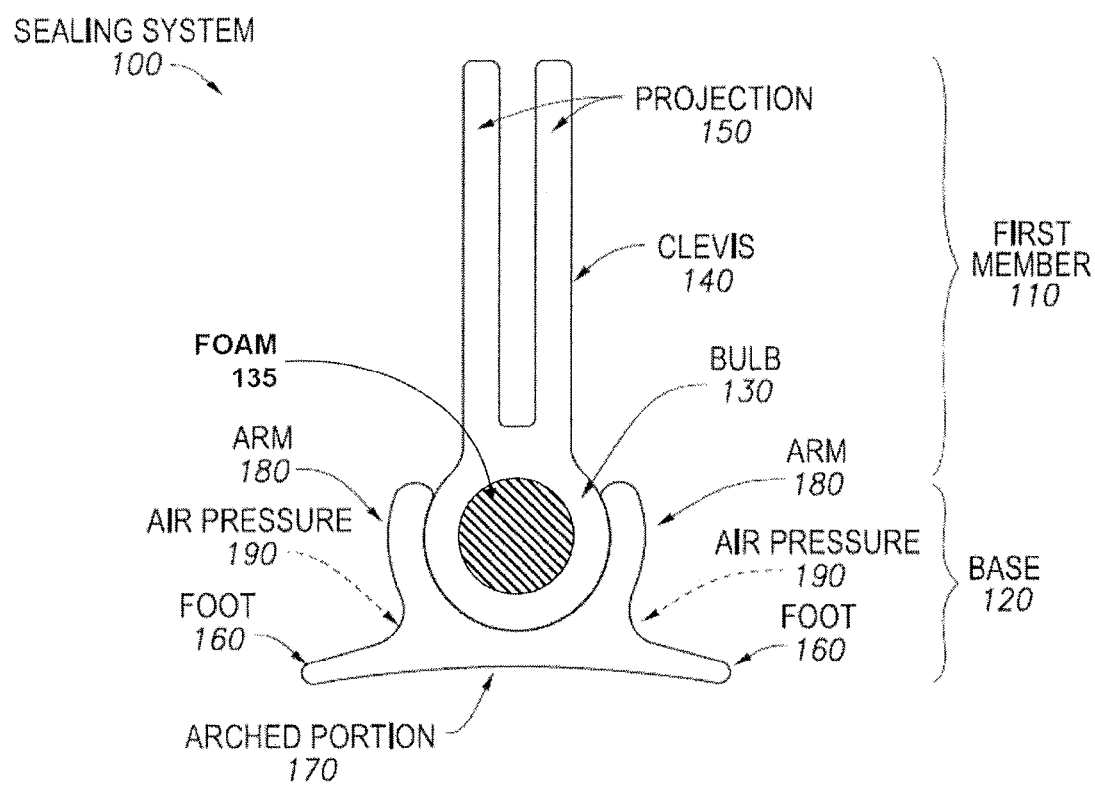
FIG. 1 illustrates a section view of a sealing system, in accordance with certain embodiments.

FIG. 1 illustrates a section view of a sealing system 100 in accordance with certain embodiments. Sealing system 100 may include a first member 110 and a base 120. In certain embodiments, first member 110 may be adapted to couple to base 120. In certain embodiments, first member 110 may include bulb 130, clevis 140, and one or more projections 150. In certain embodiments, base 120 may include feet 160, arched portion 170, and arms 180.

In general, sealing system 100 may be adapted to aerodynamically seal two or more structures. As an example, and not by way of limitation, sealing system 100 may be adapted to seal two components of an aircraft, such as an external fuel tank and the fuselage of an aircraft. In certain embodiments, sealing system 100 may be adapted to conform to contour changes of a surface to be sealed, such as the surface of the fuselage of an aircraft. In certain embodiments, sealing system 100 may also be adapted to accommodate deflections in mating parts. For example, bulb 130 may rotate in base 120 to self align to deflections between mating parts. In certain embodiments, sealing system 100 may also be adapted to seal against the surface to be sealed, such as the fuselage of an aircraft, in response to air pressure on either side of sealing system 100.

First member 110 may include bulb 130. Bulb 130 may be adapted to couple to base 120. In certain embodiments, bulb 130 may be coupled to clevis 140 formed by one or more projections 150. In certain embodiments, bulb 130 may couple first member 110 to base 120 by arms 180, which may be adapted to accept bulb 130. In certain embodiments, bulb 130 may be adapted to allow rotation of first member 110 relative to base 120. In such an embodiment, rotation of bulb 130 may advantageously allow sealing system 100 to self-align. In certain embodiments, bulb 130 may be bonded to base 120. In such an embodiment, bonding bulb 130 to base 120 may provide the advantage of a low-cost means of creating left and right-handed seals on contoured surfaces. Bulb 130 may also have vertical compression capability or springiness. In certain embodiments, vertical compression or springiness of bulb 130 may accommodate up and down deflections.

In certain embodiments, bulb 130 may be in the shape of a circle. In certain other embodiments, bulb 130 may be any suitable shape. Bulb 130 may be formed of any suitable material. The material forming bulb 130 may depend on the particular intended application of sealing system 100. As an example, and not by way of limitation, bulb 130 may be formed of conductive metal. In certain other embodiments, bulb 130 may be formed of rubber. The present disclosure contemplates that many existing materials may be used for sealing system 100. As an example, and not by way of limitation, bulb 130 may be filled with foam 135.

First member 110 may also include clevis 140. Clevis 140 may be coupled to bulb 130 in any appropriate manner, or first member 110 may be a single body. In certain embodiments, clevis 140 may be formed by one or more projections 150. In certain embodiments, clevis 140 may have a U-shape as illustrated in FIG. 1. In certain other embodiments, clevis 140 may be formed in any suitable shape. Clevis 140 may be adapted to couple sealing system 110 to a first surface, such as first surface 310 discussed below in reference to FIG. 3. As an example, and not by way of limitation, the first surface may be a panel, such as a projection from an aircraft component. In certain embodiments, coupling of sealing system 100 via first member 110 to the first surface may be accomplished by inserting a portion of the first surface into clevis 140 (e.g., between projections 150). In certain embodiments, clevis 140 may be adapted to accept a portion of the first surface.

In certain embodiments, the one or more projections 150 forming clevis 140 may be formed of the same material as bulb 130. In certain other embodiments, the one or more projections 150 forming clevis 140 may be formed of a different material from bulb 130. Projections 150 forming clevis 140 may be formed from any suitable material. In certain embodiments, projections 150 may be removably coupled to bulb 130 with a fastener. In certain other embodiments, projections 150 may be permanently attached. In certain other embodiments, projections 150 and bulb 130 of first member 110 may be one solid body. The present disclosure contemplates any suitable means of coupling projections 150 to bulb 130.

Base 120 may be adapted to couple to first member 110 via bulb 130. The present disclosure contemplates that base 120 may be formed of any suitable material, which may vary depending on the particular intended application of sealing system 100. For example, and not by way of limitation, base 120 may be formed of fluorosilicone, silicone, rubber, plastic, or any suitable elastomeric material. In certain embodiments, base 120 may be formed using traditional extrusion technologies. In certain other embodiments, base 120 may be custom molded for a particular application of sealing system 110. The present disclosure contemplates production of base 110 using any suitable methods.

Base 120 may include one or more feet 160. Feet 160 may be adapted for positioning against a second surface, such as surface to be sealed 300 discussed below in reference to FIG. 3. As an example, and not by way of limitation, the surface to be sealed may be a portion of the body of an aircraft. In certain embodiments, arched portion 170 may be positioned between feet 160.

Arched portion 170 may be formed in the shape of a arch. The arched shape of arched portion 170 may be any suitable angle. In certain embodiments, arched portion 170 may be positioned against a surface to be sealed. As an example, and not by way of limitation, arched portion 170 may be positioned against a surface of an aircraft. In certain embodiments, arched portion 170 may form a preloaded seal. Air pressure exerted on a side of sealing system 110 may cause a change in shape of arched portion 170. For example, air pressure may be exerted on a side of base 120, as indicated by arrows 190. In certain embodiments, in response to the air pressure on a side of base 120, the position of arched portion 170 may change such that base 120 is compressed against the surface to be sealed, sealing the surface and preventing air flow between base 170 and the surface to be sealed. Arched portion 170 may be adapted to seal against a surface regardless of the magnitude or direction of applied pressure. The dimensions of arched portion 170 may vary according to the characteristics of a particular application. As an example, and not by way of limitation, the dimensions of arched portion 170 may vary based on the seal pressure needed or the material being used.

In certain embodiments, base 120 may also have one or more arms 180. Arms 180 may extend from base 120 and may be adapted to accept bulb 130. Coupling of first member 110 to base 120 may be accomplished using arms 180. Arms 180 may be shaped such that they are complementary to the shape of bulb 130. In certain embodiments, arms 180 may be adapted to allow bulb 130 to rotate while first member 110 is coupled to base 120. In other embodiments, arms 180 may be bonded to bulb 130 to form left or right-handed seals.

In general, certain embodiments of sealing system 100 may be adapted to provide an aerodynamic seal between two surfaces. In certain embodiments, the surfaces to be sealed may include a first surface and a second surface. In certain embodiments, the first surface may be a portion of a component such as a panel. In certain embodiments, the second surface may be a surface to be sealed, such as all or a portion of a surface of the body of an aircraft or vehicle. In certain embodiments, sealing system 100 may be adapted to extend along the length of the surfaces, providing an aerodynamic seal adapted to prevent the flow of air between the first and second surfaces. In certain embodiments, the first and second surfaces may have deflections between mating parts, and sealing system 100 may be adapted to self align with such deflections. In certain embodiments, sealing system 100 may be adapted to adjust to contours of the second surface.

Figure 2:
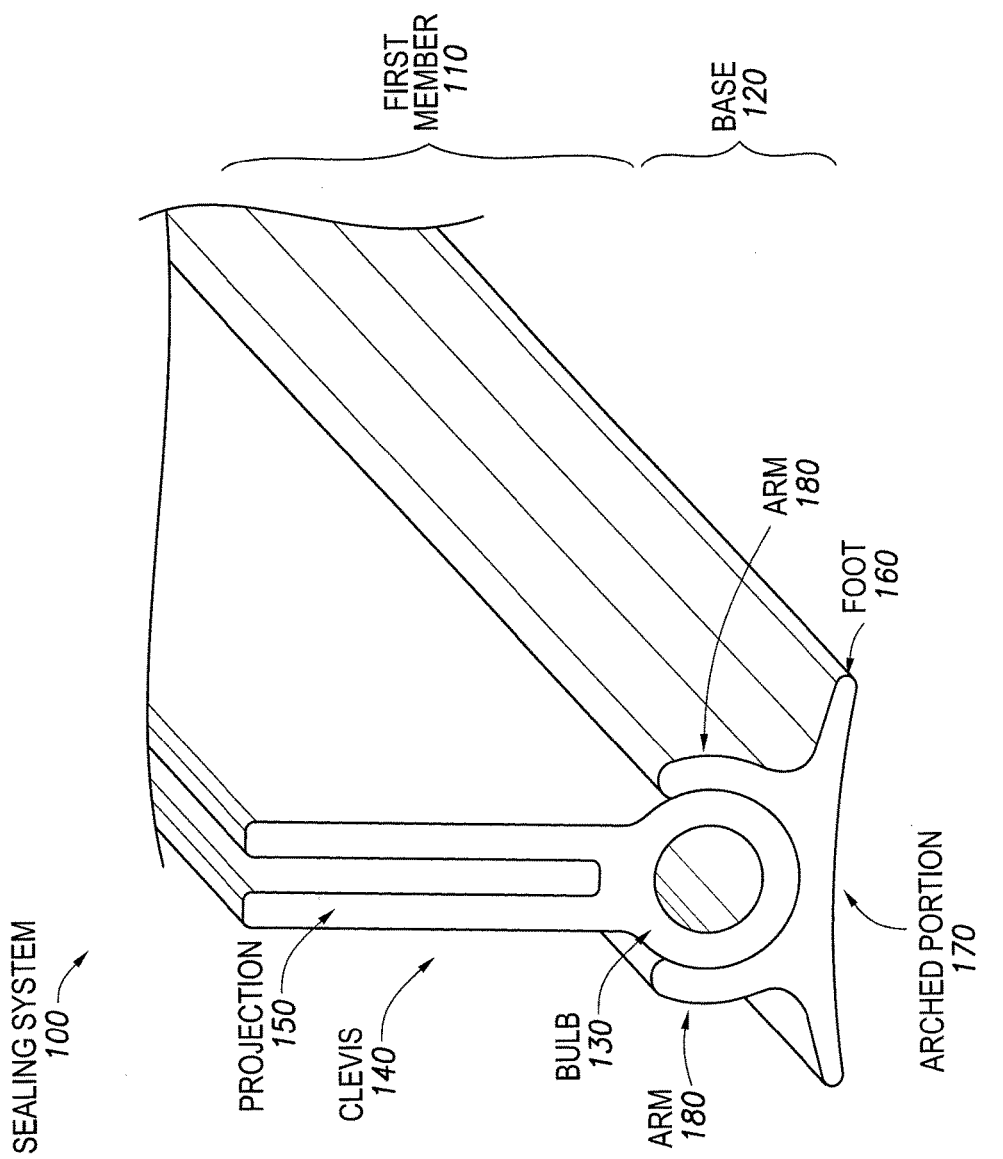
FIG. 2 illustrates another view of the sealing system of FIG. 1, in accordance with certain embodiments.

FIG. 2 illustrates another view of sealing system 100 in accordance with an embodiment of the present invention. Sealing system 100 may be adapted to extend along a portion of a surface to be sealed. Thus, sealing system 100 may extend lengthwise along a surface. The dimensions of sealing system 100 may vary according to the particular intended application of sealing system 100. Sealing system 100 may be any suitable length. As an example, and not by way of limitation, sealing system 100 may extend along all or a portion of the length of a surface to be sealed. In certain embodiments, base 120 may be adapted to fit against surfaces that are square to the base 120 of sealing system 100. In certain other embodiments, base 120 may be adapted to fit against angled surfaces that are not square to the seal. Base 120 may be designed to fit against a surface to be sealed having surface properties that vary along the length of the seal. As an example, and not by way of limitation, sealing system 100 may be adapted to conform to contour changes of the surface to be sealed. In certain embodiments, the surface to be sealed may be all or a portion of a surface of an aircraft, car, boat, or any other vehicle.

Figure 3:
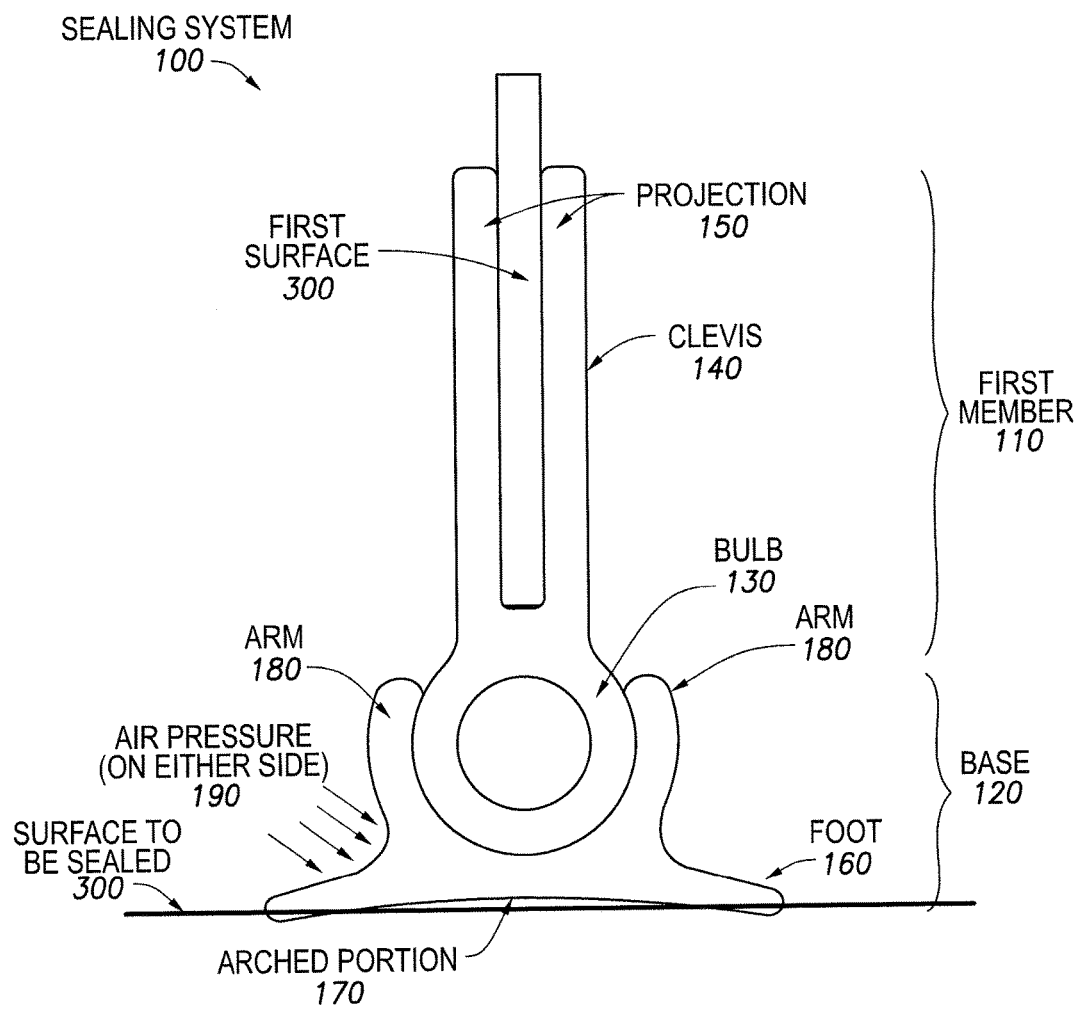
FIG. 3 illustrates a view of a sealing system coupled to a surface, in accordance with certain embodiments.

FIG. 3 illustrates a view of sealing system 100 positioned against a surface to be sealed 300. In certain embodiments, base 120 may be positioned with feet 160 against surface to be sealed 300. As an example, and not by way of limitation, surface to be sealed 300 may be the surface of an aircraft. In some embodiments, base 120 may be bonded to surface to be sealed 300. Bulb 130 of first member 110 may be coupled to base 120 by arms 180. Clevis 140 of first member 110 may be formed by one or more projections 150. In certain embodiments, first member 110 may be coupled to a first surface 310 by clevis 140. In certain embodiments, first surface 310 may be a panel. In certain embodiments, first surface 310 may be a portion of an aircraft, car, boat or other vehicle. Clevis 140 may be adapted to accept first surface 310 between one or more projections 150. In certain embodiments, panel 310 may be affixed to first member 110 by any appropriate bonding. In certain other embodiments, panel 310 may simply rest in clevis 140.

Figure 4:
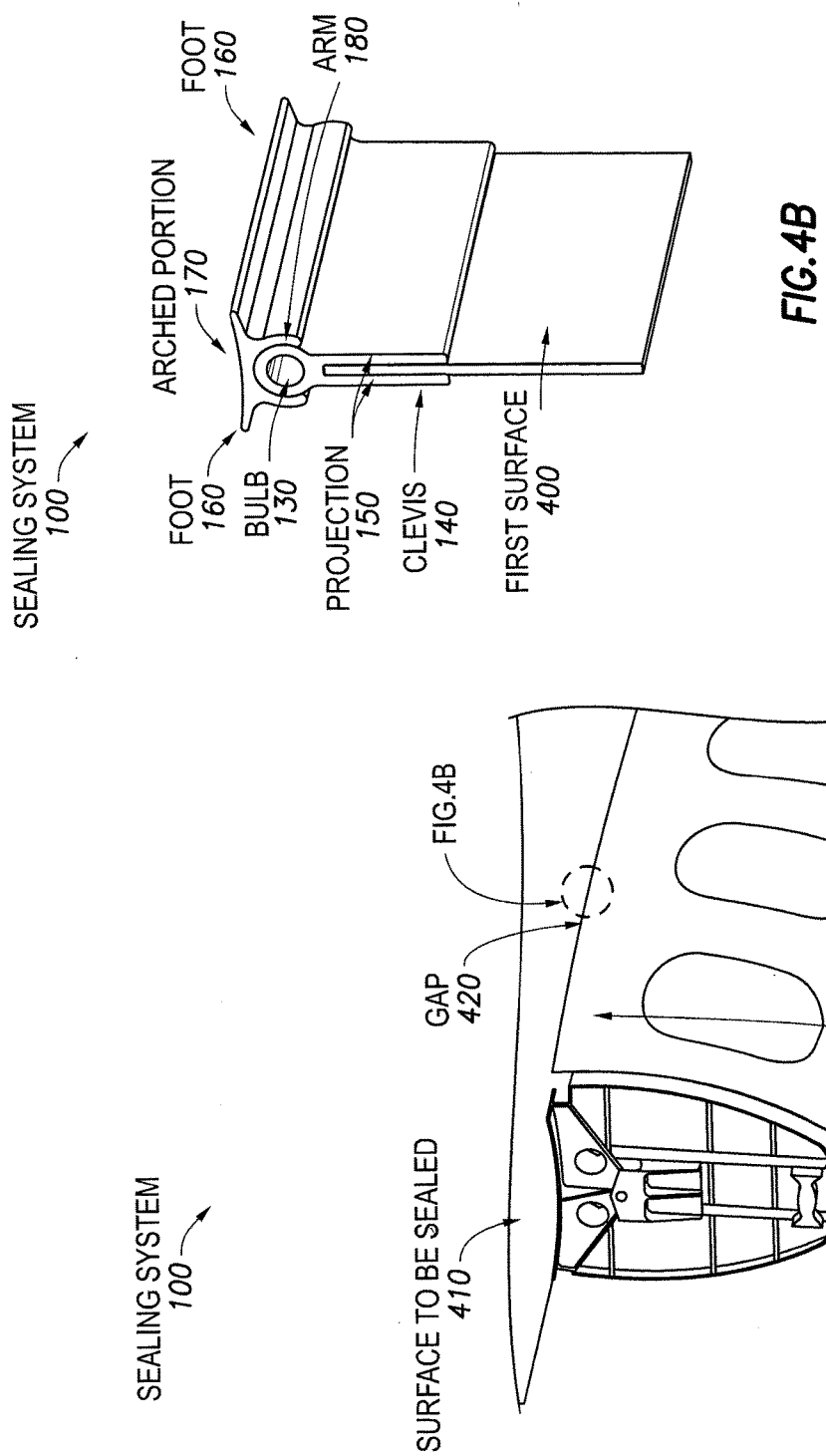
FIG. 4A illustrates an environmental view of an installed sealing system, in accordance with certain embodiments.
FIG. 4B illustrates a sealing system that may be used in the area indicated in FIG. 4A, in accordance with certain embodiments.

In operation, sealing system 100 may form an aerodynamic seal. As an example, and not by way of limitation, sealing system 100 may be used on the surface of an aircraft to provide an aerodynamic seal between external components of the aircraft and a surface of the aircraft. In certain embodiments, it may be desirable to seal a component of an aircraft (e.g., an external fuel tank as illustrated in FIG. 4) to a surface of an aircraft, such as the fuselage, to seal the components from external and internal differential pressures. Clevis 140 of first member 110 may be adapted to couple to a first surface 310 of a component. In certain embodiments, first surface 310 may be a panel, as illustrated in FIG. 3. First surface 310 and the surface to be sealed 300 may have deflections between mating parts. First member 110 may be adapted to absorb deflections between first surface 310 and the surface to be sealed 300. In certain embodiments, the surface to be sealed 300 may be the fuselage of an aircraft. Base 120 may also be adapted to conform to contour changes of the surface to be sealed 300.

As an example, and not by way of limitation, during flight, air pressure 190 may be exerted against a side of sealing system 100. When air pressure 190 is exerted against a side of base 120, arched portion 170 of base 120 is forced toward the surface to be sealed 300 (e.g., the fuselage of an aircraft). In certain embodiments, air pressure 190 causes sealing system 100 to seal against surface to be sealed 300. Sealing against surface to be sealed 300 in response to air pressure 190 may be desirable because it may prevent air from flowing between sealing system 100 and surface to be sealed 300, thereby sealing the aircraft structures from external and internal differential pressures and improving aerodynamics.

FIG. 4A illustrates an environmental view of an installed sealing system 100, in accordance with certain embodiments. In general, sealing system 100 aerodynamically seals a gap 420 between first surface 400 and a surface to be sealed 410. In certain embodiments, and as illustrated in FIG. 4A, first surface 400 may be a surface of an external component of an aircraft, such as a fuel tank. In certain embodiments, and as illustrated in FIG. 4A, the surface to be sealed 410 may be a surface of an aircraft, such as the fuselage. In an embodiment such as the one illustrated in FIG. 4A, sealing system 100 may advantageously improve aerodynamics and keep out moisture or other debris. The present disclosure contemplates that first surface 400 and surface to be sealed 410 may be any suitable surfaces. For example, first surface 400 and surface to be sealed 410 may be surfaces of any suitable structures that require sealing from external and internal differential pressures.

FIG. 4B illustrates a sealing system 100 that may be used in the area indicated in FIG. 4A, in accordance with certain embodiments. In certain embodiments, feet 160 of base 120 may be positioned against surface to be sealed 410. In certain embodiments, base 120 may be bonded to surface to be sealed 410. Base 120 may be adapted to conform to contours on surface to be sealed 410. In certain embodiments, arched portion 170 may form a preloaded seal. As a preloaded seal, arched portion 170 may be adapted to press against surface to be sealed 410 in response to pressure being exerted against base 120. In certain embodiments, by pressing against surface to be sealed 410, base 120 may advantageously prevent flow of air between base 120 and surface to be sealed 410, thereby sealing surface to be sealed 410 and first surface 400 from internal and external differential pressure. In certain embodiments, base 120 may be coupled to first member 110 via bulb 130.

In certain embodiments, bulb 130 may be coupled to base 120 via arms 180. First member 110 may be include one or more projections 150. In certain embodiments, the one or more projections 150 may form clevis 140. In certain embodiments, first member 110 may be adapted to accept a portion of first surface 400 in clevis 140. In certain embodiments, first surface 400 may be bonded to first member 110.

In certain other embodiments, first surface 110 may rest in clevis 140 of first member 110. As an example, and not by way of limitation, first surface 410 may simply slide into clevis 140. In such an embodiment, not bonding first surface 410 may allow relative motion of the first surface without causing the seal to break.

In certain embodiments, bulb 130 may be adapted to rotate in base 120. Rotation of bulb 130 may advantageously allow sealing system 100 accommodate deflections between first surface 400 and surface to be sealed 410. As an example, and not by way of limitation, sealing system 100 may be adapted to self-align to deflections between an external fuel tank and the fuselage of an aircraft. In certain embodiments, bulb 130 may be fixed in first member 130 via bonding. Sealing system 100 may be adapted to bond bulb 130 to base 120 in order to create left or right-handed turns.

In certain embodiments, bulb 130 may have properties including vertical compression or springiness. Vertical compression or springiness may allow bulb 130 to compress, advantageously allowing sealing system 100 to accommodate up and down deflections between portions of first surface 400 and surface to be sealed 410. As an example, a portion of first surface 400 may extend closer to surface to be sealed 410, resulting in a shorter gap 420 between first surface 400 and surface to be sealed 410. In certain embodiments, bulb 130 may be adapted to compress to absorb this deflection while still allowing an aerodynamic seal between first surface 400 and surface to be sealed 410.

As noted above, the components of sealing system 100 may be formed of any suitable materials. In certain embodiments, first member 110 may be formed of conductive metal or rubber. In certain embodiments, base 120 may be formed of fluorosilicone, silicone, rubber, plastic, or any suitable elastomeric material. Depending on the particular application of sealing system 100, the materials used to form first member 110 and base 120 may be different. In certain embodiments, the material used to form first member 110 may be stiffer than that used to form base 120.

In general, sealing system 100 may be adapted to seal a variety of surfaces from differential internal and external pressures. Although FIGS. 4A and 4B illustrate sealing system 100 being used to aerodynamically seal a gap 420 between surfaces of an aircraft and an external component of an aircraft, the present disclosure contemplates that sealing system 100 may be used to seal a variety of surfaces, including those of a car, boat, or any other vehicle in addition to those of an aircraft. Additionally, in certain embodiments sealing system 100 may be adapted to seal windows and doors, such as windows and doors of a house or other structure. In such an embodiment, the ability of bulb 130 to be bonded to base 120 to create left and right-handed seals may be advantageous. In such an embodiment, sealing system 100 may be adapted to seal surfaces from internal and external differential pressures. The dimensions of sealing system 100 may vary according to the particular application.

Figure 5:
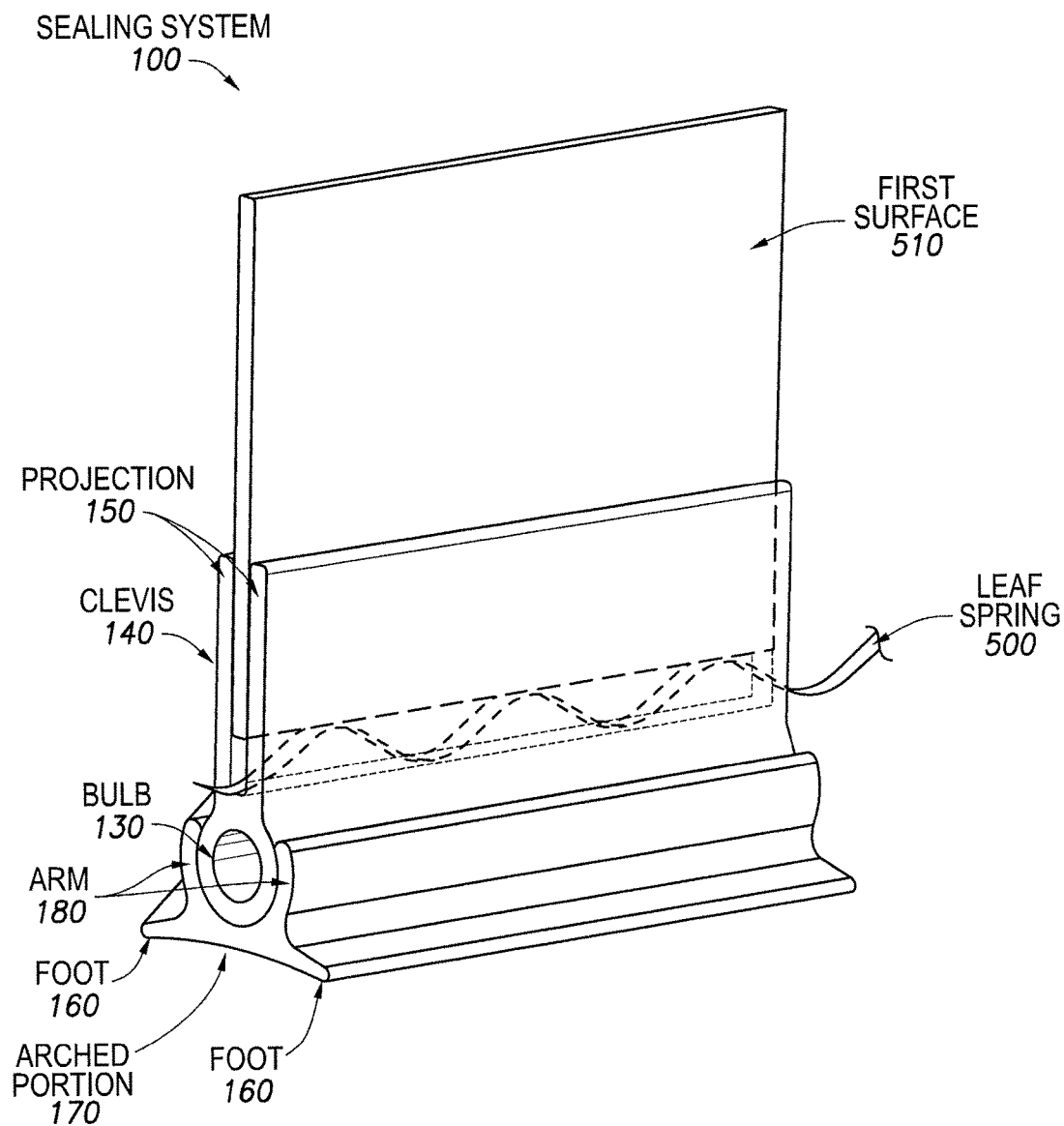
FIGS. 5-7 illustrate various sealing systems, in accordance with certain embodiments.

FIG. 5 illustrates a view of a sealing system 100 in accordance with certain embodiments. In this embodiment, sealing system 100 may be provided with a leaf spring 500. In certain embodiments, leaf spring 500 may provide additional advantages to sealing system 100.

As discussed above, sealing system 100 may include a first member 110 and a base 120. In certain embodiments, first member 110 may have a bulb 130, and a clevis 140 formed from one or more projections 150. First member 110 may be adapted to couple to base 120. In certain embodiments, base 120 may include feet 160, arched portion 170, and arms 180. In certain embodiments, arms 180 may be adapted to accept bulb 130 to couple first member 110 to base 120.

Clevis 140 of first member 110 may be adapted to accept a first surface 510. In certain embodiments, first surface 510 may be inserted substantially all the way into clevis 140. In certain other embodiments, clevis 140 may also include a leaf spring 500. In certain embodiments, leaf spring 500 may be positioned at the base of clevis 500. In certain embodiments, first surface 510 may contact leaf spring 500 at the base of clevis 140. The present disclosure contemplates that leaf spring 500 may be formed from any suitable material, and may have any suitable dimensions.

In general, including leaf spring 500 in sealing system 100 may advantageously improve the ability of sealing system 100 to accommodate up and down deflection between mating surfaces, such as deflections between first surface 510 and a surface to be sealed, such as the fuselage of an aircraft or surface of any other vehicle as discussed above in FIG. 4. In certain embodiments, sealing system 100 may be adapted to accommodate up and down deflection in part due to the compression capability or springiness of bulb 130. In certain embodiments, addition of leaf spring 500 may enhance the ability of sealing system 100 to accommodate up and down deflections. In certain other embodiments, first member 110 may be formed of conductive metal. In such an embodiment, first member 110 alone may not have much vertical compression or springiness to accommodate up and down deflections. Addition of leaf spring 500 to such an embodiment may improve sealing system 100's ability to accommodate up and down deflections between a first surface 510 and a surface to be sealed.

Figure 6:
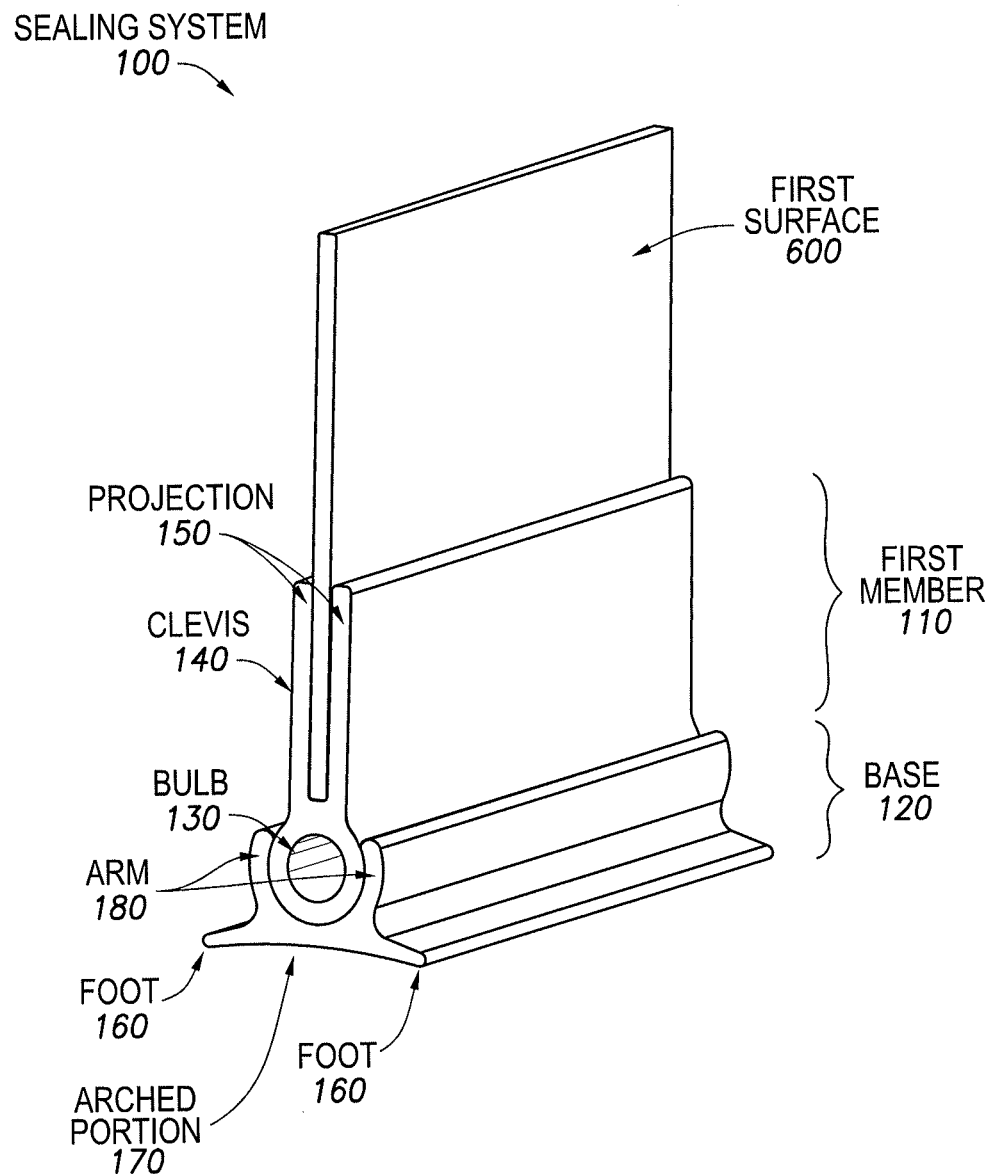

FIG. 6 illustrates a view of a sealing system 100 in accordance with certain embodiments. The view illustrated in FIG. 6 is similar to FIG. 2 discussed above, with the primary difference being that FIG. 6 illustrates a first surface 600 coupled to first member 110. Sealing system 100 may include a first member 110 having a bulb 130 and a clevis 140 formed from one or more projections 150. First member 110 may be coupled to base 120. Base 120 may include one or more feet 160, arched portion 170, and one or more arms 180. Arms 180 may be adapted to accept bulb 130 to couple first member 110 to base 120.

In general, sealing system 100 is adapted to aerodynamically seal a first surface and a second surface, such as a surface to be sealed, from internal and external differential pressures. In certain embodiments, and as illustrated in FIG. 6, clevis 140 may be adapted to accept a portion of first surface 500. In certain embodiments, first surface 500 may simply rest in clevis 140. Such an embodiment may be desirable where it is necessary to removably couple first member 110 to first surface 600. In certain other embodiments, first surface 600 may be bonded to first member 110 in clevis 140. The present disclosure contemplates that the dimensions of sealing system 100 may vary according to the particular application of sealing system 100.

Figure 7:
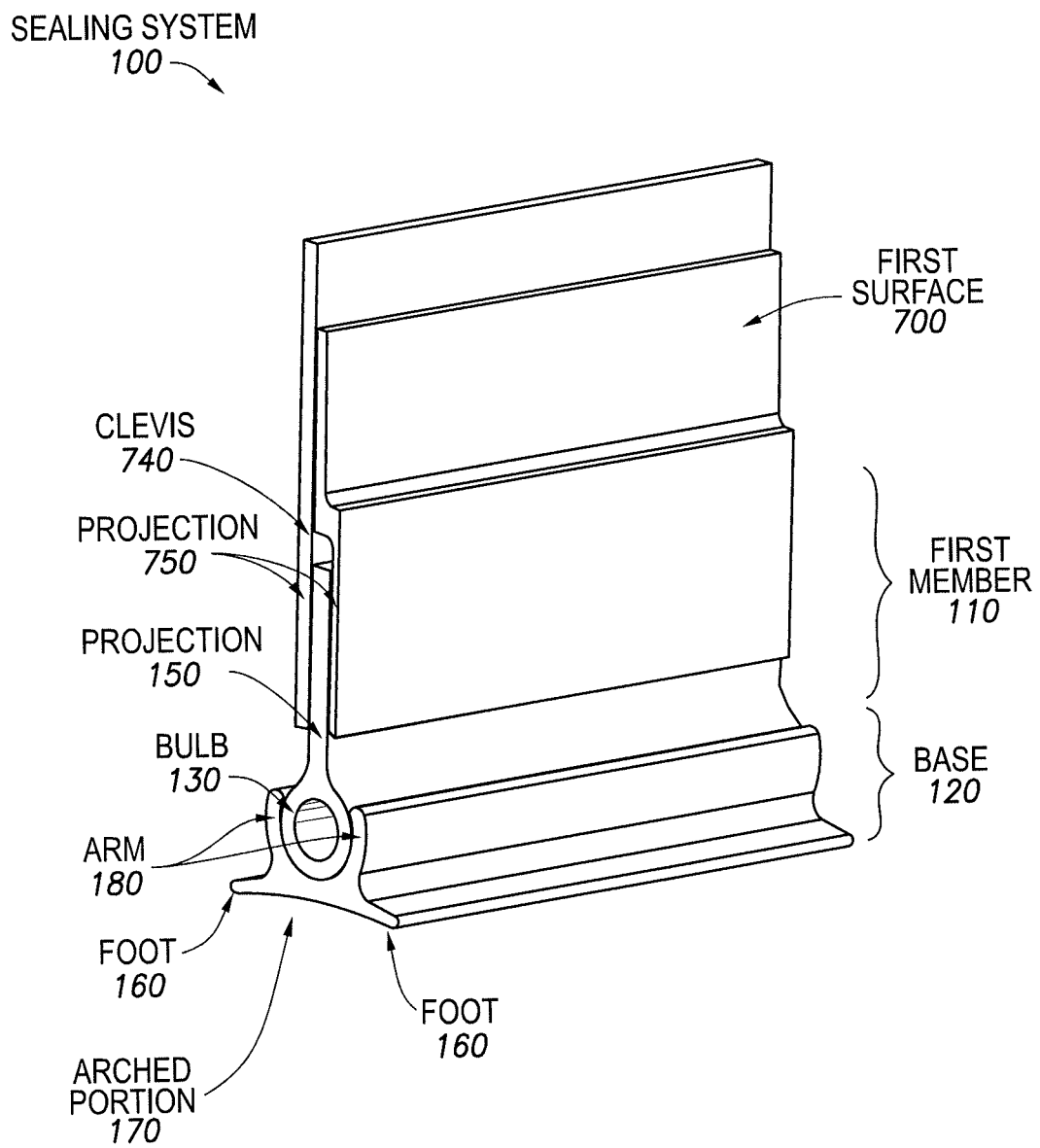

FIG. 7 illustrates a view of a sealing system 100 in accordance with certain embodiments. In certain embodiments, sealing system 100 may have a base 120 and a first member 110. Base 120 may have one or more feet 160, arched portion 170, and one or more arms 180. In certain embodiments, arms 180 may be adapted to couple base 120 to first member 110 via bulb 130. In certain embodiments, feet 160 may rest against a surface to be sealed, such as surface to be sealed 410 discussed above in relation to FIG. 4. In certain embodiments, the surface to be sealed may be the surface of an aircraft, car, boat, or any other vehicle. In certain embodiments, arched portion 170 may form a preloaded seal designed to seal when pressure is exerted against a side of sealing system 170.

In certain embodiments, first member 110 may include bulb 130. Bulb 130 may be adapted to rotate in base 120 to accommodate deflections between a first surface 700 and a surface to be sealed. In certain embodiments, and as illustrated in FIG. 7, first member 110 may include a single projection 150. Projection 150 may extend from bulb 130. In certain embodiments, first member 110 may be adapted to couple to a portion of a first surface 700 via projection 150.

In general, sealing system 100 may be adapted to aerodynamically seal a gap between first surface 700 and a surface to be sealed (not shown). In certain embodiments, first surface 700 may be a portion of an external component of an aircraft, and the surface to be sealed may be a surface of an aircraft, such as the fuselage. Sealing system 100 may be adapted to accommodate deflections between first surface 700 and a surface to be sealed. Sealing system 100 may couple first member 110 to first surface 700 in any suitable manner.

In certain embodiments, first surface 700 may include a clevis 740 formed from one or more projections 750. Clevis 740 may be adapted to accept projection 150 of first member 110, thereby coupling first member 110 to first surface 700. In certain embodiments, projection 150 of first member 110 may rest in clevis 140. In certain other embodiments, projection 150 may be bonded within clevis 740.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An apparatus, comprising:
    a first member comprising:
        a clevis comprising two parallel projections configured to couple to a first surface by accepting the first surface in the clevis in an area between the two projections, wherein each of the two parallel projections comprises a substantially constant thickness throughout a length of each of the two parallel projections;
        a compressible bulb coupled to the clevis and configured to accommodate up and down deflections of the first surface relative to a second surface by compressing, wherein:
            an end of each of the two parallel projections is coupled to the bulb; and
            the bulb comprises a shape forming a hollow closed circle; and
    a deformable base formed from a material that changes shape when air pressure is exerted against a side of the base, the base comprising:
        a pair of feet configured to be positioned against the second surface, the second surface comprising a surface to be sealed;
        an arched portion located between the feet, wherein a tip of a convex portion of the arched portion is located at a midpoint between the pair of feet;
        a preloaded seal formed by the arrangement of the pair of feet and the arched portion, the preloaded seal configured to seal against the second surface when air pressure is exerted against the side of the base; and
        a plurality of arms configured to accept the bulb, the plurality of arms comprising a shape that is complementary to a shape of the bulb;
    wherein the apparatus is configured to provide an aerodynamic seal between the first surface and the second surface.

2. The apparatus of claim 1, wherein the base is composed of a material selected from a group comprising fluorosilicone, silicone, rubber, and plastic.

3. The apparatus of claim 1, wherein the first member is composed of a material selected from a group comprising conductive metal and rubber.

4. The apparatus of claim 1, further comprising a leaf spring positioned in the clevis.

5. The apparatus of claim 1, wherein the bulb can rotate in the base to self-align with deflections.

6. The apparatus of claim 1, wherein:
    the bulb is foam filled.

7. The apparatus of claim 1, wherein the bulb is removably coupled to the base.

8. The apparatus of claim 1, wherein the bulb is bonded to the base.

9. An apparatus, comprising:
    a first member comprising:
        a first portion comprising two parallel projections configured to couple the first member to a first surface by accepting the first surface in a clevis in an area between the two projections, wherein each of the two parallel projections comprises a substantially constant thickness throughout a length of each of the two parallel projections;
        a compressible bulb coupled to the first portion and configured to accommodate up and down deflections of the first surface relative to a second surface by compressing; wherein:
            an end of each of the two parallel projections is coupled to the bulb; and
            the bulb comprises a shape forming a hollow closed circle; and
    a deformable base formed from a material that changes shape when air pressure is exerted against a side of the base, the base comprising:
        a pair of feet configured to be positioned against the second surface, the second surface comprising a surface to be sealed;
        an arched portion located between the feet and adapted to couple the base to the second surface, wherein a tip of a convex portion of the arched portion is located at a midpoint between the pair of feet;
        a preloaded seal formed by the arrangement of the pair of feet and the arched portion, the preloaded seal configured to seal against the second surface when air pressure is exerted against the side of the base; and
        a plurality of arms configured to accept the bulb of the first member, the plurality of arms comprising a shape that is complementary to a shape of the bulb.

10. The apparatus of claim 9, wherein the apparatus is configured to provide an aerodynamic seal between the first and second surfaces.

11. The apparatus of claim 9, wherein the base is composed of a material selected from a group comprising fluorosilicone, silicone, rubber, and plastic.

12. The apparatus of claim 9, wherein the first member is composed of a material selected from a group comprising conductive metal and rubber.

13. The apparatus of claim 9, wherein the bulb is bonded to the base.

14. The apparatus of claim 13, further comprising a leaf spring positioned in the clevis.

15. A system, comprising:
a first surface;
a second surface comprising a surface to be sealed;
a sealing system configured to provide an aerodynamic seal between the first surface and the second surface, the sealing system comprising:
  a first member comprising:
    a clevis comprising two parallel projections configured to couple the first member to the first surface by accepting the first surface in the clevis in an area between the two projections, wherein each of the two parallel projections comprises a substantially constant thickness throughout a length of each of the two parallel projections;
  a compressible bulb coupled to the clevis and configured to accommodate up and down deflections of the first surface relative to the second surface by compressing, wherein:
    an end of each of the two parallel projections is coupled to the bulb; and
    the bulb comprises a shape forming a hollow closed circle; and
  a deformable base formed from a material that changes shape when air pressure is exerted against a side of the base, the base comprising:
    a pair of feet configured to be positioned against the second surface;
    an arched portion located between the feet, wherein a tip of a convex portion of the arched portion is located at a midpoint between the pair of feet;
    a preloaded seal formed by the arrangement of the pair of feet and the arched portion, the preloaded seal configured to seal against the second surface when air pressure is exerted against the side of the base; and
    a plurality of arms configured to accept the bulb, the plurality of arms comprising a shape that is complementary to a shape of the bulb.

16. The system of claim 15, wherein the first member is composed of a material selected from a group comprising conductive metal and rubber.

17. The system of claim 15, wherein the base is composed of a material selected from a group comprising fluorosilicone, silicone, rubber, and plastic.

18. The system of claim 17, further comprising a leaf spring positioned in the clevis.

19. The system of claim 15, wherein the bulb is bonded to the base.

* * * * *